Feb. 18, 1936.  M. L. STROMBERG  2,031,189
NUTCRACKER
Filed Nov. 7, 1933
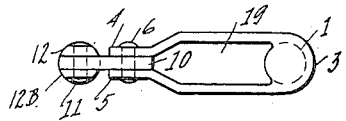
Fig. 5.
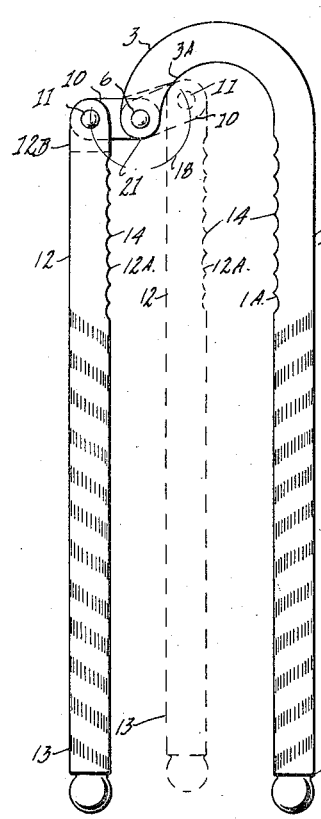
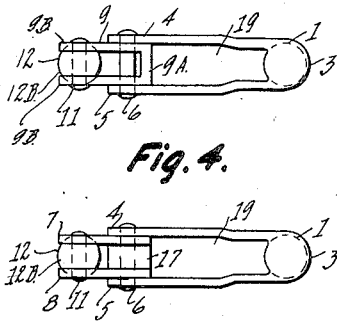
Fig. 4.
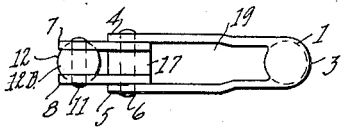
Fig. 3.
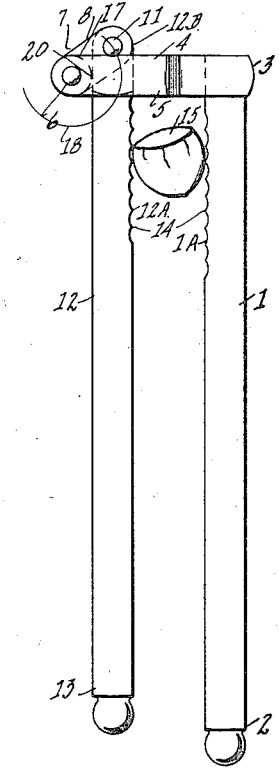
Fig. 1.
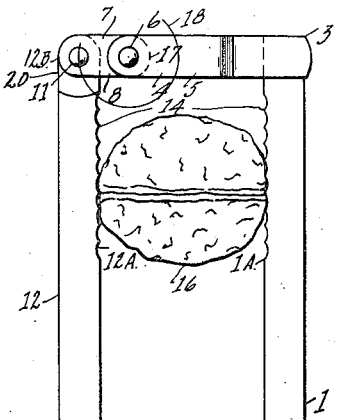
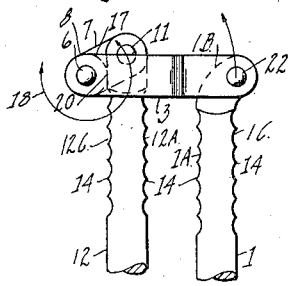
Fig. 7.
Fig. 6.
Fig. 2.
Martin L. Stromberg
Inventor.

Patented Feb. 18, 1936

2,031,189

UNITED STATES PATENT OFFICE 2,031,189

NUTCRACKER

Martin L. Stromberg, Marshfield, Oreg.

Application November 7, 1933, Serial No. 697,013

5 Claims. (Cl. 146—16)

Nuts vary considerably in shape and size, and in the structure of their shell. A small nut may be as hard to crack as one several times as large. Many ingenious devices have been invented which are adapted to crack both small and large nuts or which are adapted to exert adequate pressure to crack hard tough nuts. Most of these devices are too complicated, too costly, or require too much adjustment or time to make them. As a consequence, one of the first and most simple of the nutcrackers invented is still most popular. This nutcracker comprises a pair of levers pivoted at their upper ends, one to each end of a connecting link. The action of these levers upon a nut placed between them is that of levers of the second class. In this instance, the levers exert pressure on the nut from diametrically opposite sides. It is apparent that the closer the nut is positioned with relation to the pivoted ends of the levers the greater will be the pressure exerted upon it by any force acting on the lower ends of the levers. In other words, the pressure exerted is to the force as the distance from the pivot to the point of pressure is to the distance from the pivot to the point of the application of the force. As above constructed, a large nut placed close to the pivoted ends of the levers in order to take advantage of the greater pressure will cause the lower ends of the levers to be spaced too far apart to be readily grasped by the hand—especially if the hand is that of a woman or child. The women and children crack most of the nuts brought into the homes. In order that they may use the above device the large nut must be positioned farther from the pivoted ends of the levers with a consequent decrease in the amount of pressure that may be exerted upon it.

One of the objects of my invention is to permit a like amount of pressure to be exerted upon two or more nuts which vary considerably in size without a consequently increased force or distance thru which said force moves.

Another object is to provide a nutcracker that is neat in appearance, inexpensive to make, so simple that a child may use it, and so powerful that he or she may readily crack hard tough nuts, both small and large.

I show such a nutcracker in the drawing accompanying this specification in which Fig. 1 is a side view showing one modification of my nutcracker arranged to take a small nut; Fig. 2 shows the same modification arranged to take a large nut; Fig. 3 is a top view of Fig. 2; Fig. 4 is a top view of a nutcracker showing the link means as a U-shaped element; Fig. 5 is a top view showing the link means as a single straight element; Fig. 6 is a side view showing another modification of my nutcracker, using a single straight link means; Fig. 7 is a side view of still another modification.

Thruout the drawing and specification similar numerals refer to similar parts.

The lever 1, as shown in Figs. 1 to 5 is substantially an L-shaped structure, the longer leg of which constitutes the handle portion 2, which is of circular cross section and which may be embellished as desired, and the shorter leg which constitutes the head 3. The head 3 may be formed integrally with the handle 2 or be fixedly secured thereto, to form said L-shaped structure. In Figs. 1 to 5, the head 3 is shown bifurcated to form the jaws 4 and 5. In these jaws is positioned the pivot 6 upon which is pivoted the link means which, in Figs. 1 to 3, includes the two straight elements 7 and 8; in Fig. 4, the U-shaped element 9; and in Fig. 5, the single straight element 10. The opposite end of the link means employed, is pivoted upon the pivot 11 upon which is also pivoted the upper end 12B of the lever 12 which may have its lower or handle portion 13 embellished to match the handle portion 2 of the lever 1. The inner faces 1A and 12A adjacent the head 3 are provided with the serrations 14 whereby a better grip may be had upon the nut 15 or 16 placed between them. In Figs. 3 and 4, the jaws 4 and 5 are offset outwardly and in Fig. 5 they are offset inwardly to give support to the link means. In Fig. 4, the portion 9A serves as a spreader and gives support to the side portions 9B. In the embodiment shown in Fig. 3, it is desirable that a filler 17 be provided to serve as a spreader and support for the elements 7 and 8, or that a shouldered pivot (not shown) be employed. The end 12B of the lever 12 is flattened when the link means 7 and 8 or 9 are employed or it is bifurcated for the reception of the link means 10. Whether the connecting means comprising the two straight elements 7 and 8, the U-shaped element 9, or the single straight element 10, is used, the jaws 4 and 5 are made sufficiently long to permit the pivot 11 to follow the arc 18 so that it may assume the position shown in Fig. 1, which is in the space 19 between said jaws. It will be noted, in Fig. 2, that in exerting pressure upon the large nut 16 an outward pull is exerted upon the pivots 6 and 11, or in other words, the link means is in tension. When exerting pressure upon the small nut 15 shown in Fig. 1, an outward push is exerted upon the pivots 6 and 11, or in other words, the link means is in compression. When the link means is in tension it maintains its position but when it is in compression its tendency is to change its position. To hold it in fixed position when in compression I make the link means of such length that the pivot 11 will be above the pivot 6 when the portion 20 of the lever 12 is in contact with the filler 17.

In Fig. 6 the levers 1 and 12 are of circular cross section. The head 3 is formed integrally with the handle portion 2 and is shown curved to provide the outer depending end 21 which is bifurcated for the reception of the single straight link element 10 which is also pivotable in the end 12B of the lever 12 bifurcated to receive it. By providing the depending end 21 the pivot 11 may assume a position above the pivot 6 when the end 12B of the lever 12 is in contact with the portion 3A of the head 3 which, in this instance, serves as a stop against further upward movement.

A primary object of the head 3 is to permit the pivot 6 to be spaced to the right or the left of the axis of the handle portion 2 of the lever 1. In Fig. 7 I have pivotably connected the head 3 to the handle portion 2 of the lever 1 by providing the pivot 22 which in this instance, I position to the right of the axis of the handle portion 2 of the lever 1 by offsetting the upper end 1B thereof. It is evident, without further illustration, that the end 1B may be otherwise shaped to permit this same positioning of the pivot 22. It will be noted in Fig. 7 that the faces 1C and 12C which are diametrically opposite the faces 1A and 12A of the levers 1 and 12 are also provided with the serrations 14. Constructed as shown in Fig. 7 the lever 1 may be positioned to work to the right or the left of the lever 12 whereby said levers may be spaced apart, when in parallel relation, such distances as, for instance, ⅜″, ¾″, 1⅛″, and 1½″. The relation of the lever 12 to the lever 1 may be changed almost instantly whereby a maximum pressure may be exerted on either a small or large nut with a minimum movement of said levers at the point where the force is applied.

What I claim is:

1. The combination, in a nutcracker, of an elongated lever having a crushing surface adjacent one end and a handle portion at the other end, a rigid laterally extending head portion, one end of which is fixed to the end of the lever adjacent the crushing surface and the other end of which is shaped to provide a depending portion, a second elongated lever having a crushing surface and a handle portion, and a link means pivotally connected at one end to the depending portion of said head and at the other end to the second lever adjacent the crushing surface end thereof.

2. The combination, in a nutcracker, of an elongated lever having a crushing surface adjacent one end and a handle portion at the other end, a rigid laterally extending U-shaped head portion, one leg of which is fixed to the end of the lever adjacent the crushing surface, a second elongated lever having a crushing surface and a handle portion, and a link means pivotally connected at one end to the free leg of said laterally extending portion and at the other end to the second lever adjacent the crushing surface end thereof.

3. The combination, in a nutcracker, of an elongated lever having a crushing surface adjacent one end and a handle portion at the other end, a rigid laterally extending bifurcated head portion, one end of which is fixed to the end of the lever adjacent the crushing surface, a second elongated lever having a crushing surface and a handle portion, and a link means pivotally connected at one end to the second lever adjacent the crushing surface end thereof and at the other end to the ends of the legs, formed by the bifurcation of the head, which are spaced apart and of such length as to allow the link means and the pivot connecting the second lever with said link means to pass thru between the legs of the bifurcated head.

4. The combination, in a nutcracker, of an elongated lever having a crushing surface adjacent one end and a handle portion at the other end, a rigid laterally extending bifurcated head portion, one end of which is pivotally connected to the end of the lever adjacent the crushing surface, a second elongated lever having a crushing surface and a handle portion, and a link means pivotally connected at one end to the second lever adjacent the crushing surface end thereof and at the other end to the ends of the legs, formed by the bifurcation of the head, which are spaced apart and of such length as to allow the link means and the pivot connecting the second lever with said link means to pass thru between the legs of the bifurcated head.

5. The combination, in a nutcracker, of an elongated lever having a crushing surface adjacent one end and a handle portion at the other end, a rigid laterally extending bifurcated head portion, one end of which is pivotally connected to the end of the lever adjacent the crushing surface and at a point spaced from the axis of the lever, a second elongated lever having a crushing surface and a handle portion, and a link means pivotally connected at one end to the second lever adjacent the crushing surface end thereof and at the other end to the ends of the legs, formed by the bifurcation of the head, which are spaced apart and of such length as to allow the link means and the pivot connecting the second lever with said link means to pass thru between the legs of the bifurcated head.

MARTIN L. STROMBERG.